United States Patent
Corl, Jr. et al.

(10) Patent No.: US 6,484,171 B1
(45) Date of Patent: Nov. 19, 2002

(54) SYSTEM METHOD AND COMPUTER PROGRAM FOR PRIORITIZING FILTER RULES

(75) Inventors: Everett Arthur Corl, Jr., Raleigh, NC (US); Anthony Matteo Gallo, Apex, NC (US); Clark Debs Jeffries, Durham, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,333

(22) Filed: Mar. 31, 2000

(51) Int. Cl.[7] ............................................. G06F 17/30
(52) U.S. Cl. ........................ 707/7; 707/102; 707/104.1
(58) Field of Search ......................... 707/7, 102, 104.1; 345/581; 370/255, 351; 455/512; 700/104; 706/45, 47, 48; 709/103; 713/201; 716/4, 12

(56) References Cited

U.S. PATENT DOCUMENTS

| | | | |
|---|---|---|---|
| 5,058,033 A | 10/1991 | Bonissone et al. ............. 706/46 |
| 5,280,479 A | 1/1994 | Mary ........................... 370/462 |
| 5,377,354 A | * 12/1994 | Scannell et al. ............... 706/45 |
| 5,530,703 A | 6/1996 | Liu et al. ..................... 370/225 |
| 5,546,390 A | 8/1996 | Stone ........................... 370/408 |
| 5,574,910 A | 11/1996 | Bialkowski et al. ........... 707/1 |
| 5,642,410 A | * 6/1997 | Walsh et al. ................. 379/128 |
| 5,754,543 A | 5/1998 | Seid ............................. 370/351 |
| 5,761,424 A | 6/1998 | Adams et al. .............. 709/217 |
| 5,802,289 A | 9/1998 | Oprescu ..................... 709/248 |
| 5,822,527 A | 10/1998 | Post ........................... 709/206 |
| 5,848,233 A | 12/1998 | Radia et al. ................. 713/201 |
| 6,256,769 B1 | * 7/2001 | Tamarkin et al. ............. 716/12 |

* cited by examiner

*Primary Examiner*—Diane D. Mizrahi
*Assistant Examiner*—Apu M Mofiz
(74) *Attorney, Agent, or Firm*—Joscelyn G. Cockburn

(57) ABSTRACT

This process accepts rule domination declarations and subjects rules to a computer program which either finds a type of administrative error (cyclic domination) or assigns a priority number to each rule so that any two rules which intersect (some key fits both rules) have necessarily different priority numbers. In the case that priority numbers are assigned, the process goes on to check for a second type of administrative error, namely inclusion of a first rule in a second (every key which fits the first rule also fits the second), and with the second having higher priority (so that the first is never referenced). If neither error occurs, then the number of different priority numbers is minimized. Every key when tested by such a rule set with neither error must fit either no rules at all or must fit exactly one rule with highest priority. In the latter case, the action of the unambiguously determined rule can then be applied to the packet represented by the key.

24 Claims, 6 Drawing Sheets

RULE DATA BASE FORMAT

| SA | DA | SP | DP | PROTOCOL | ACTION |
|----|----|----|----|----------|--------|

|←———————————— 48 ————————————→|←— 50 —→|

SA = SOURCE ADDRESS
DA = DESTINATION ADDRESS
SP = SOURCE PORT
DP = DESTINATION PORT

EACH SEGMENT SA, DA, SP, DP, PROTOCOL HAS AN UPPER BOUND AND LOWER BOUND.

FIG. 2

IP FRAME FORMAT

| SA | DA | SP | DP | PROTOCOL | INFORMATION | ED |
|----|----|----|----|----------|-------------|-----|

|←——————————— KEY ———————————→|

ED = ENDING DELIMITER

FIG. 3

SYSTEM METHOD AND COMPUTER PROGRAM FOR PRIORITIZING FILTER RULES

CROSS-REFERENCE TO RELATED PATENT APPLICATION

Patent Application Ser. No. 09/312,148, now U.S. Pat. No. 6,298,340 filed May 14, 1999, by Jeffries et al, entitled "System and Method and Computer Program for Filtering Using Tree Structure", discloses a filtering method that determines if the key in an IP packet matches a rule in a database.

BACKGROUND OF THE INVENTION

1. Field of the Invention

The present invention relates to traffic management in a communications network and, in particular, to filtering of traffic in said network. Specifically, it describes a method for assignment of priority numbers to rules. Priority numbers are essential both in organizing rule searches and in detecting administrative errors.

2. Prior Art

The use of filter systems to manage the flow of traffic in a communications network is well known in the prior art. The filter systems include filter rules that are used to test information in a packet.

In some prior art, ways of testing the filter rules are listed sequentially and information from the packet is presented to the first rule in the list. If the packet information passes the requirements of the rule, the action of the rule is applied to the packet. Otherwise, the packet information is then tested against the next rule, and so on. The sequential method of testing rules is straightforward and simple, but slow.

Another prior art method uses decision trees or parallel calculations to test information in the packet against the rules. For example, U.S. Pat. No. 5,546,390 describes a tree structure in which two or more bits from the header of a packet are tested at each node of the tree. Prior art described in that patent discloses techniques consisting of testing individual bits or contiguous blocks of bits (for example, 32 contiguous bits constituting a destination address).

U.S. Pat. No. 5,574,910 also teaches filtering by use of a binary tree search method in which tree nodes use masks and ranges to make decisions.

U.S. Pat. No. 5,761,424 teaches in general terms the use of programmable criteria to accomplish high-speed filtering through bit tests and compares.

Still other filtering techniques are disclosed in U.S. Pat. Nos. 5,530,703; 5,761,424; 5,848,233 and 5,822,527.

It would not be uncommon to find that information, termed the "key", in the packet could fit several rules within a database of rules. This condition is termed "Rules Intersection" (described hereinafter). Whenever this condition occurs, the system would break down unless a mechanism and method are provided to address this condition. To the best of our knowledge, the prior art does not include the systematic resolution of this problem as disclosed herein. That is, there is a need to provide a mechanism and method that addresses the condition of a packet matching multiple rules. It is this problem the present invention addresses. In addition, the present invention addresses two types of administrative errors, termed "cyclic domination" and "inclusion of one rule in another," resulting in some rules not being referenced. Suffice it to say at this point that both types of errors can cause failure in a filtering system unless they are detected and appropriate corrective actions are taken. The prior art neither addresses nor recognizes these errors in the manner of the present invention, so far as we know.

SUMMARY OF THE INVENTION

The present invention addresses the problems by assigning priority numbers to rules. The priority numbers are assigned in an efficient and clear manner so that any two rules that intersect (some keys fit both rules) have necessarily different priority numbers. Rules with the same priority numbers do not intersect.

In assigning priority numbers and in executing related algorithms and methods, the present invention will do the following upon presentation of new rules:

- explicitly query the network administrator to enter a domination declaration for every preexisting rule which intersects a new rule;
- build the intersection table and the priority number assignments as rules are entered (rules are entered in any order);
- alert the network administrator if inconsistencies of two types occur; namely cyclic domination declaration and inclusion declaration;

The present invention prompts the administrator to declare domination relationships only between pairs of rules which intersect. Again, two rules intersect if some key fits both rules.

In a preferred embodiment of the present invention, information is communicated to the administrator by means of computer generated graphics or text or both. The graphical presentation is in the form of a directed non-cycle graph. Specifically, a vertex in the rule set graph (discussed in detail below) corresponds to a rule. Edges connecting rules are drawn precisely if two rules intersect (one key fits both rules). Such an edge is endowed with a pointer designating domination of one rule by another when the administrator declares that domination. The pointer is directed from the lower priority rule to the higher priority rule. Finally, when a new rule has been added and all dominations declared, the present invention tests the rules for consistency. Then the present invention either informs the user of errors and awaits corrections, or notifies the user that the rules are consistent and computes and displays new priority numbers for the rules.

Filter rules are generally expressed in terms of inequalities to be satisfied by the components of a key. An important example concerns IP headers in which the following information is used to make filter decisions:

Source Address (SA) 32 bits often organized into four bytes of eight bits each with a dot (.) designating separation, or equivalently four integers with values in the interval [0, 255] presented with a dot (.) designating separation such as 17.3.1.18, or equivalently one integer with value in the interval [0, 4,294,967,295] such as 285,409,554;

Destination Address (DA) 32 bits often organized into four bytes of eight bits each with a dot (.) designating separation, or equivalently four integers with values in the interval [0, 255] presented with a dot (.) designating separation such as 17.3.1.18, or equivalently one integer with value in the interval [0, 4,294,967,295] such as 285,409,554;

Source Port (SP) 16 bits, or equivalently an integer with value in the interval [0, 65,535];

Destination Port (DP) 16 bits, or equivalently an integer with value in the interval [0, 65,535];

Protocol (P) 8 bits, or equivalently an integer with value in the interval [0, 255].

The above five components are called the five dimensions used in IP filtering or, collectively, the five-tuple.

Every IP filter rule which uses the above data types can be stated as a combination of ten integers, namely, the ten integers being the upper integer and lower integer limits of a rule in the five dimensions.

Thus the above rule specifications can pertain to the important but special case of IP (Internet Protocol) headers. The present invention not only applies to that case but also every other system of filtering on a protocol with fixed format headers. Indeed, the present invention in describing the organizing of filter rules applies to any filtering system, including those filtering on packet data and on variable length keys. The two basic concepts are intersection (two rules intersect if one key fits both) and inclusion (one rule is included in a second if every key that fits the first also fits the second).

Continuing with the example of filtering in IP, any rule can be written as a 10-tuple of integers, the aforementioned upper and lower limits of values of components of keys which fit the rule, in the following form:

(sa, SA, da, DA, sp, SP, dp, DP, p, P)

Here, sa is the lower limit of Source Address, SA is the upper limit of Source Address, da is the lower limit of Destination Address, and so on.

Two rules $R_1$, $R_2$ are defined to intersect if one key fits both. In terms of IP headers, intersection is equivalent to the following 10 statements being all true:

$sa_1 <= SA_2$ $da_1 <= DA_2$ $sp_1 <= SP_2$ $dp_1 <= DP_2$ $p_1 <= P_2$
(intersection) $sa_2 <= SA_1$ $da_2 <= DA_1$ $sp_1 <= SP_1$ $dp_2 <= DP_1$ $p_2 <= P_1$ The present invention examines all distinct pairs from a set of N rules and finds those pairs which intersect. In a data base, all intersections are entered as a pair of rule labels {i,j} where i and j are in {0, 1, 2, . . . , N-1}, rule i intersects rule j, and i<j.

Furthermore, the present invention queries the system administrator as a new rule is To added to a rule set about intersections in which the new rule is a member. The query includes asking which of the two intersecting rules (the new rule and a preexisting rule) dominates in the event that one key is tested and fits both rules. The response of the administrator is called declaring domination.

Furthermore, the present invention includes the Priority Number Algorithm as explicitly described below. The value of a priority number is a natural number 1, 2, 3, . . . The subset of rules with highest priority are those not dominated by any other rule, and they all have priority number 1. If one rule or more rules with priority number 1 dominate one rule or more other rules, then those rules which are so dominated but not dominated by any other rules comprise a subset of rules each of which is given priority number 2. If one rule or more rules with priority number<=2 dominate one rule or more other rules, then those rules which are so dominated but not dominated by any other rules comprise a subset of rules each of which is given priority number 3. This relationship and priority number allocation is extended by an algorithm in the present invention to all rules.

Furthermore, after all domination relationships between a new rule and all preexisting rules it intersects are explicitly stated as above, the present invention calculates a priority number for each new rule as well as a priority number for all the rules already in the rule set. The present invention uses the Priority Number Algorithm (described in detail below) to accomplish this.

Furthermore, upon allocating priority numbers the present invention then enables a filter rule mechanism to determine which of two or more rules which fit a key to apply. Namely, of all rules which do apply, the one to select is the one rule with highest priority (lowest priority number). The present invention contains a proof that no two rules which intersect can possibly have the same priority number as generated by the Priority Number Algorithm. Hence the problem of which rule to apply is mathematically guaranteed to have a unique and easily decidable answer.

Two administrative errors can occur in filter rule specification; to wit:

rules that can never be logically referenced can be described and entered, wasting resources and falsely suggesting that a certain action will be taken for certain keys; and circular domination patterns which can make deciding which rule to apply impossible.

The first error type is: if every key which fits rule i also fits rule j (a relationship called inclusion of rule i in rule j, to be defined precisely below for IP headers) and if rule j dominates rule i, then rule i will never be referenced. The second error type is: if several rules intersect with the first dominating the second, the second dominating the third, and so on, and the last dominating the first, then the rules are said to have circular domination. If a key fits all the rules in the cycle, then no rule can be selected for application to the key.

Furthermore, the present invention automatically informs the administrator if either of the above errors is made upon the introduction of a new rule.

The foregoing and other features and advantages of the invention will be more fully described in the accompanying drawings.

BRIEF DESCRIPTION OF THE DRAWINGS

FIG. 2 shows a format for an IP Rule.

FIG. 3 shows an IP frame format.

DETAILED DESCRIPTION OF THE PREFERRED EMBODIMENT

The invention to be described hereinafter can be used in any environment in which one wishes to organize, study, or test for logical correctness of a set of rules with possible intersections (in which one key fits two or more rules) or possible inclusions (in which every key that fits some first rule necessarily fits some second rule). It works well in a communications system in which there is frame classification or frame filtering. As a consequence, it will be described in that environment. However, this should not be construed as a limitation upon the scope of the invention since one skilled in the art could use the teachings in other environments in which one wishes to classify items. If the invention is used in such an environment, it is intended that the claims set forth below will be applicable.

Figure 1:
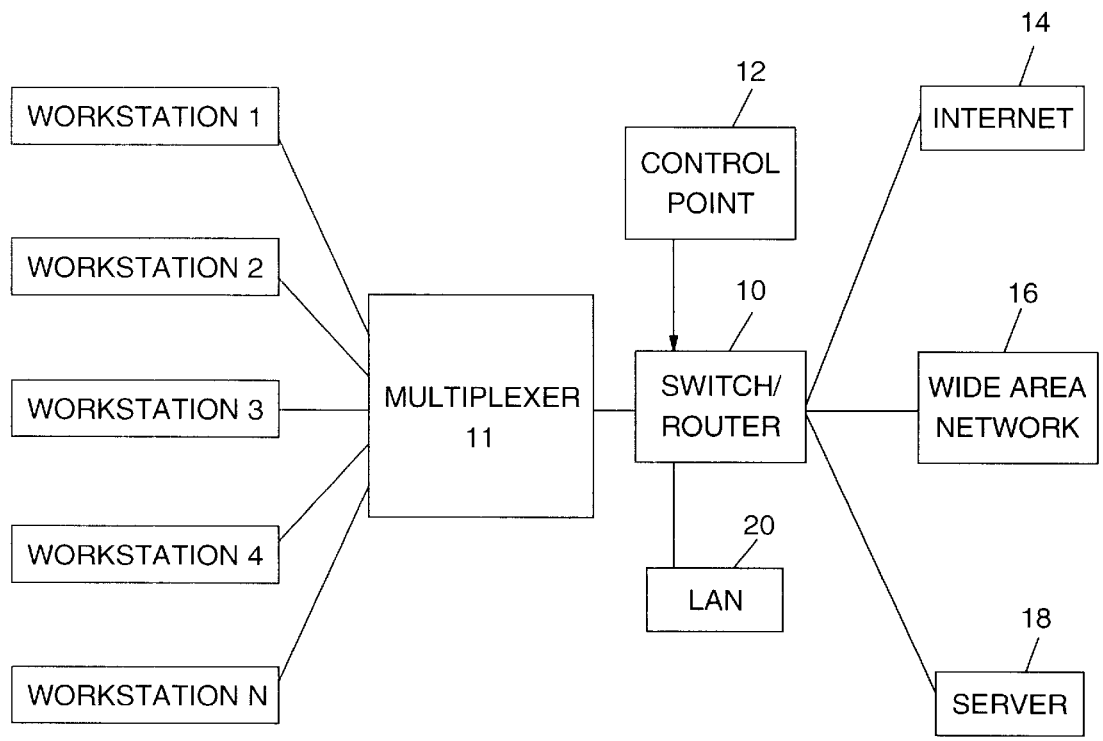
FIG. 1 shows a Communication System embodying the teachings of the present invention.

FIG. 1 shows a block diagram of a communications network in which the present invention is implemented. The communications network includes a Switch/Router 10 connected through a simple multiplex device (Multiplexer) 11 to Workstations 1 through N (a LAN), a Control Point 12, Internet 14 or some other form of Wide Area Network (WAN) 16, Server 18, and another Local Area Network (LAN) 20. A LAN can be ethernet, token-ring or any other local area network which might include many additional workstations. Those skilled in the art will understand that a great variety of combinations of such elements is possible in permutations of FIG. 1. In particular, some elements could be duplicated and others deleted. The Multiplexer 11 is a conventional off-the-shelf device that selects one of the plurality of attached workstations and allows it to communicate with the switch/router. The use of multiplexers to provide such services are so well known that further description is not warranted.

Figure 7:
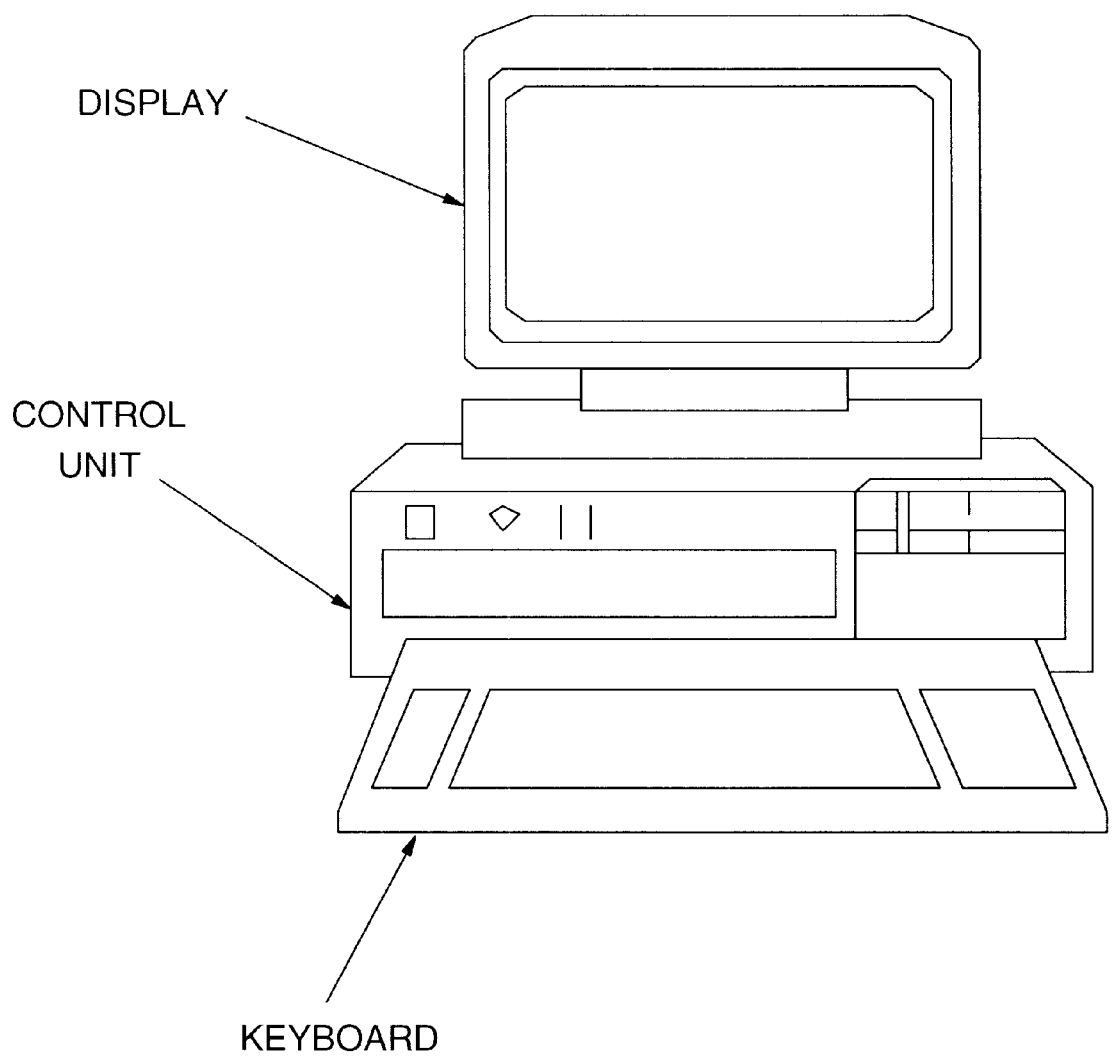
FIG. 7 shows a workstation including a control unit.

Still referring to FIG. 1, the Control Point 12 provides the interface between the switch/router and the network administrator. In one embodiment of the present invention, the control point includes a computer comprising a keyboard, control unit, display, etc. (FIG. 7).

More particular, the computer includes a system bus to which a central processing unit (CPU), a memory, RAM, ROM, I/O devices, display device, etc., are coupled. The I/O devices, including a keyboard, scanner, pointing devices (mouse), etc., are coupled through appropriate interfaces to the system bus. The display device includes a cathode ray tube which is connected through an appropriate graphic controller to the system bus. The graphic controller, in response to information provided by a driver in the CPU, displays information to the administrator. As will be discussed hereinafter, the displayed information may include prompts or queries from the CPU. The displayed information may also include the non-cyclic directed graph (discussed hereinafter), etc. The CPU is provided with a conventional multi-tasking operating system, software drivers and application programs that configure the computer to operate according to the teachings of the present invention.

FIG. 2 shows an IP header Rule Database Format. It consists of Segments 48 which have upper and lower bounds for each of SA, DA, SP, DP, Protocol (P) and an Action portion in segment 50. The Action portion lists the action to be taken if a key (described hereinafter) fits the rules.

FIG. 3 shows an IP Frame Format. The Frame Format includes a section termed "Key", an Information section, and an Ending Delimiter (ED) section. The Key section of the frame includes an SA field, DA field, SP field, DP field and Protocol (P) field. The key section of the IP frame is correlated with rules in the Rule Database to determine if the key matches one of the rules in the database. If it does, the Action set forth in the matching rule is taken relative to the frame. If the key matches multiple rules, the present invention causes the action associated with the highest priority rule to be taken.

Figure 4:
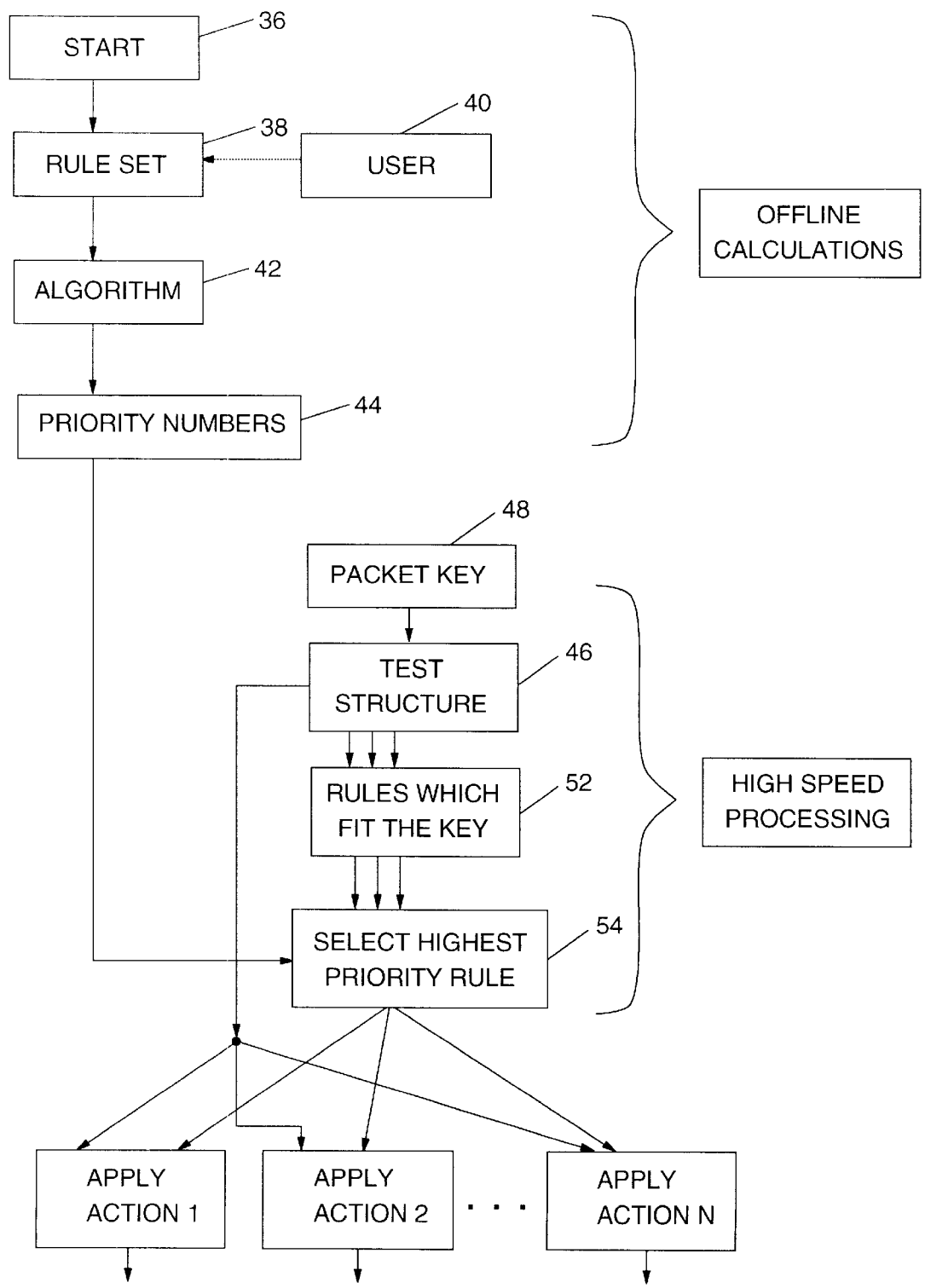
FIG. 4 shows a flowchart of the Frame Classification System according to the teachings of the present invention.

FIG. 4 shows a Frame Classification System including the teachings of the present invention. The process labeled OFFLINE CALCULATIONS is practiced in the Control Point (FIG. 1) with the computer (FIG. 7). Likewise, HIGH SPEED PROCESSING is done, in real time, in the Switch/Router 10 (FIG. 1).

Still referring to FIG. 4, Block 36 is the entry point into the process. From Block 36, the process descends into Block 38 where a Rule set is input by a User 40. Turning to FIG. 7 for the moment, the user uses the keyboard or other input devices to input the rules into the memory of the computer. Referring again to FIG. 4, an Algorithm 42 (described hereinafter), executing on the CPU, operates on the Rule Set to assign Priority Numbers in Block 44 which are transmitted to the select Highest Priority Rule in Block 54. The Packet Key (Block 48) inputs into the Test Structure Block 46. The Packet Key could be a portion of a frame which is received from an input such as the Internet, a Wide Area Network, LAN, etc. Alternatively, the packet key could be a portion of the frame, information derived from the frame and its origin and/or destination ports. Still other characteristics of the frame could be used to generate the packet key; such key would still fall within the teachings of the present invention.

In FIG. 4, Block 54 requires examination of all rules which a key fits. This set must be tested by comparing the priority numbers of the selected rules until the rule with the highest priority (lowest priority number) is found. Since the key in question fits all the rules of the set, the rules in the set intersect. Therefore, no two rules in the set have the same priority number (Theorum). Therefore the selection is well defined and unique.

The Test Structure 46, including a database of rules, tests selected data from the Packet Key, and at the end, does a full scale compare between a rule in the Rule Set and the Key to determine if the packet matches the rule in the Rule Set. If the key matches a single rule in the database of rules (Rule Set), the process descends into block 56 whereat one of the actions associated with the matching rule is performed.

Still referring to FIG. 4, if the key matches several rules, the process rules that fit the key (Block 52) are sent to Select Highest Priority Rule Block 54 wherein priority numbers provided by block 44 are used to select the rule that fits with highest priority (lowest priority number). When the selection is made, the Packet is then subjected to the action of the rule, one of the Apply Action 56 functions labeled 1 through n.

Still referring to FIG. 4, the Test Structure could be the filtering system set forth in the above related patent application. In the alternative, any filtering system that is able to correlate an item with a database of related items and indicate a match between the item and one or more of the items in the data, can be used.

The value of a priority number is a natural number 1, 2, 3, . . . The subset of rules with highest priority are those not dominated by any other rule, and they all have priority number 1. If one rule or more rules with priority number 1 dominate one rule or more other rules, then those rules which are so dominated but not dominated by any other rules comprise a subset of rules each of which is given priority number 2. In the event that one rule or more rules with priority number<=2 dominate one rule or more other rules, those rules which are so dominated but not dominated by any other rules comprise a subset of rules each of which is given priority number 3. This relationship and priority number allocation is extended to all rules.

In the context of the above description of IP header components, two rules $R_1$, $R_2$ are defined to intersect if the following 10 statements are all true.

Rule $R_1$ intersects Rule $R_2$:

$sa_1<=SA_2$ $da_1<=DA_2$ $sp_1<=SP_2$ $dp_1<=DP_2$ $p_1<=P_2$ (intersection)

$sa_2<=SA_1$ $da_2<=DA_1$ $sp_2<=SP_1$ $dp_2<=DP_1$ $p_2<=P_1$

Also in the context of the above description of IP header components, rule $R_1$ is said to be included in rule $R_2$ if the following 10 statements are all true.

Rule $R_1$ is included in Rule $R_2$:
$SA_1<=SA_2$ $DA_1<=DA_2$ $SP_1<=SP_2$ $DP_1<=DP_2$ $P_1<=P_2$ (inclusion)
$sa_2<=sa_1$ $da_2<=da_1$ $sp_2<=sp_1$ $dP_2<=dP_1$ $P_2<=P_2<=p_1$ Although the present invention uses IP conventions for the purpose of illustration, those skilled in the art will recognize that the definitions of intersection and inclusion given here could readily be adapted to any other fixed format packet labeling system. Also, other filter schemes might still have the concepts of intersection and inclusion, rendering them suitable for application of the present invention.

The present invention examines a new rule and all pre-existing rules and finds those pairs which intersect. In a data base, all intersecting rules are first entered as a pair of rule labels (i, j) where i and j are in {0, 1, 2, . . . , N-1}, rule i intersects rule j, and i <j. As more rules are added, the pairs of intersections are added to the database so that the database records all pairs of rules which intersect. A second database (to be labeled J below) consists of all the intersecting rule pairs except they are in order of domination. That is, a pair (i, j) of rule indices is in the second database if rules i and j intersect and rule j dominates rule i (note the order).

It will be convenient to couch the above definition of priority numbers in terms of graph theory. A graph consists of vertices and directed edges. In the present invention, each rule is identified with a vertex. Furthermore, each pair of intersecting rules is identified with an edge. If rule i and rule j intersect and if rule j dominates rule i, then the pair (i, j) is included in the database of edges. Note the order of rule label entries: the second dominates the first. In terms of graphs, the symbol (i, j) is equivalent to a directed edge from vertex i to vertex j.

In terms of graph nomenclature, a rule is said to have priority number 1 (highest priority) if all edges (possibly none) attached to the corresponding vertex are directed to it. The priority number of any other rule is one plus the number of edges in the longest directed path from it to any rule with priority number 1.

Technically the rule set with domination declarations can be thought of as construction of a directed graph. The vertices of the graph are filter rules. An edge connects two vertices if and only if the vertices correspond to intersecting filter rules. Whenever two range filter rules intersect, one must be specified as having higher priority than the other. We direct an arrowhead on each such edge pointing from the rule with lower priority to the rule with higher priority. Provided cyclic patterns of rule domination are not allowed, this must yield an acyclic directed graph.

If n is a natural number and some rule has priority number n, then we call the set of all of the rules with priority number n a priority number class.

Figure 5:
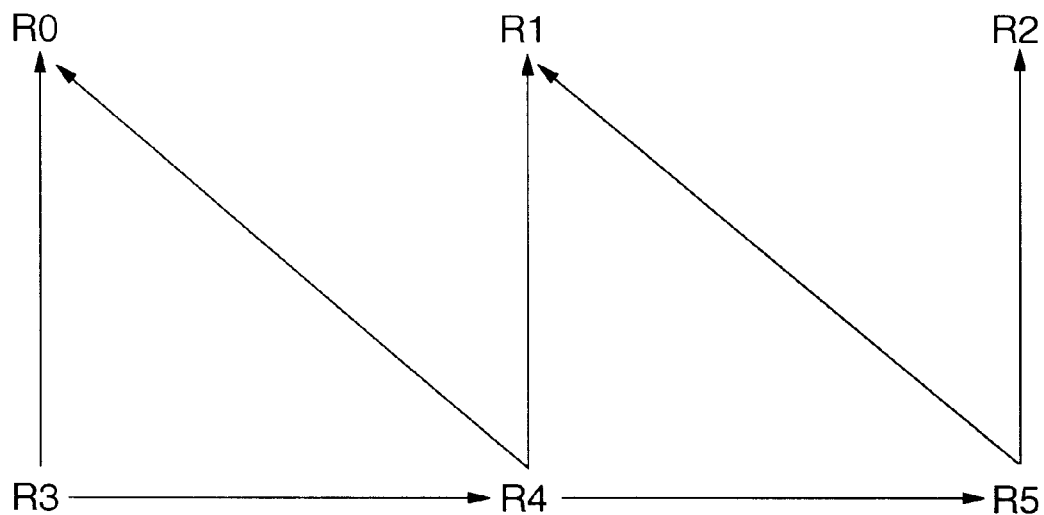
FIG. 5 shows an acyclic directed graph and corresponding priority numbers for six rules with domination declarations as specified below.

To illustrate the above concepts of applying graph notions to rule priorities, suppose six rules $\{R_0, R_1, \ldots, R_5\}$ are related as follows:

$R_0$ dominates $R_3$
$R_0$ dominates $R_4$
$R_1$ dominates $R_4$
$R_1$ dominates $R_5$
$R_2$ dominates $R_5$
$R_4$ dominates $R_3$
$R_5$ dominates $R_4$ The corresponding acyclic directed graph is shown in FIG. 5. Examination of paths in the graphs leads to the following assignment of priority numbers.

$R_0$ 1
$R_1$ 1
$R_2$ 1
$R_3$ 4
$R_4$ 3
$R_5$ 2

Thus there are four priority number classes.

A companion program could be written to test for pure inclusion (any packet that satisfies one rule must also satisfy a rule that includes it). Once priority numbers are computed, a network administrator could then examine all inclusions and verify that if one rule is included in a second, then the first has a higher priority (lower priority number) than the second. If, in our example, Rule 4 (priority number 3) were included in Rule 5 (priority number 2), then Rule 4 would never be referenced (since 3>2).

Note again that in the present invention, a correct rule set has the property that no set of rules is cyclic, that is, that the associated directed graph is acyclic. The importance of this assumption is emphasized by the following theorem.

Theorem: No two rules with the same priority number intersect.

Proof:. Suppose rules 1 and 2 intersect, both have priority number p+1, and rule 1 dominates rule 2. If p=0, then all edges involving the rules are directed to the rules. But there is an edge directed from rule 2 to rule 1, a contradiction for rule 2. Assume p>0. Then the longest path from rule 1 to some rule 3 with priority number 1 is of length p. The same path can be used along with the edge from 2 to 1 to make a path of length p+1 from rule 2 to rule 3. Thus the priority number of rule 2 is at least p+2 contradicting the stated priority number p of rule 2. QED Table 1 (below) lists the pseudo-code for an algorithm, the Priority Number Algorithm, that determines the priority numbers of filter rules when rules and domination declarations are presented as vertices and edges in an acyclic directed graph.

Method: The graph is represented as a set of N vertices {i}, each corresponding to a rule, and a set J (possibly except 2) of some ordered pairs of vertex labels {(i, j) } with (i, j) signifying: rules i and j intersect and j dominates i. Since the graph is assumed to be acyclic, not both (i, j) and (j, i) can be edges. Also associated with each vertex is a nonnegative integer k. At the beginning of the program, all k:=0. At the end of the program, the priority number of a rule (vertex) is its k value, a natural number 1, 2, 3, . . .

TABLE 1

Figure 6:
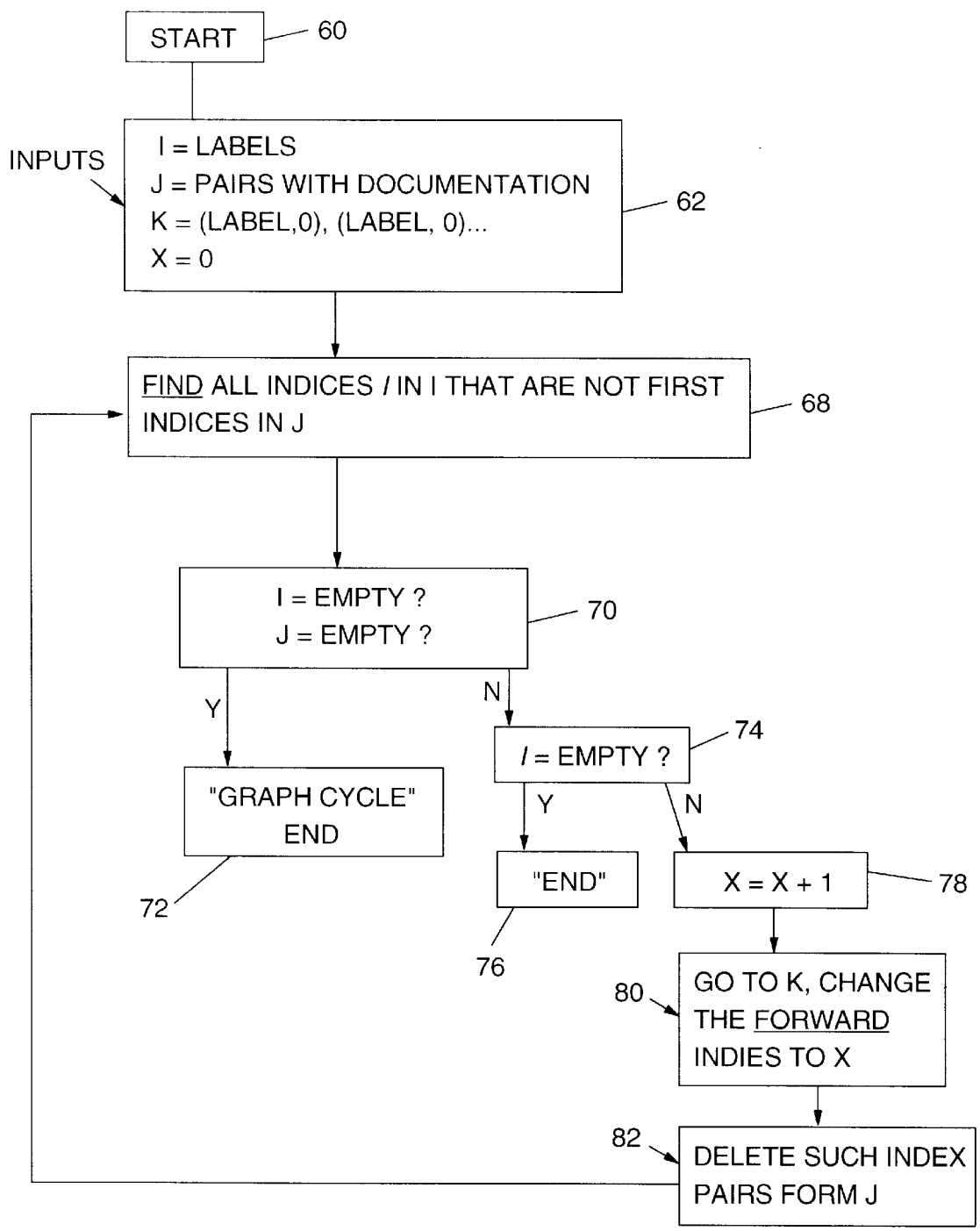
FIG. 6 shows a flowchart for the Priority Number Algorithm.

Table 1 shows the pseudo-code for the Priority Number Algorithm; whereas, Figure 6 shows a flowchart.

```
begin
Define a positive integer N              //n=the number of rules
Define a set of indices I:= {0, 1, 2, . . . ,   //these are the vertex labels
   N-1 };
Define a set of declared domination
relationship pairs of indices
J:= {. . . , (i,j), . . . };
                                         //these are directed edges,
                                         j dominates i
Define a set of pairs (vertex index, priority integer) as
K:= { (0,0), (1,0), (1,0), . . . , (N-1,0) } will
become finish product.
Define integer "current priority number" x:=0.
(Note: labels and pairs can be represented as a graph.)
1.  Find the subset I of set I consisting of all indices which
    do not occur as first indices in pairs in J.
2.  If I = empty and J = not empty, write "graph has a cycle" and end;
    else
```

TABLE 1-continued

Table 1 shows the pseudo-code for the Priority Number Algorithm; whereas, Figure 6 shows a flowchart.

3. If I = empty, write assignment of priority numbers completed" end; else
4. Define x:=x+1;
   //this increases the assigned priority number with each iteration
5. For each pair in K with first index in I, change the second index to x; // this assigns a priority number to same rules
6. Delete each such index pair from J.
   //this erases all current sink vertices and their edges from the graph
7. Goto 1.

FIG. 6 shows a flowchart for the Priority Number algorithm. The algorithm starts at 60. Sets of labels are defined in 62. The set of indices I occurring as first indices in the current set J of confirmation pairs is defined in 68. Then I and J are tested as empty or nonempty in 70. A cycle is found if we branch to 72. Else, I is tested again. The algorithm can end if we branch to 76. Else increment the priority number value x in 79. Then assign that value x to same rules in 80. Then delete such newly labeled rules from J in 82. Then go to 68.

As stated earlier, the pseudo-code (Table 1), when applied to the above six intersecting rules, yield the graph and priority numbers as shown in FIG. 5.

In summary, the present invention includes the following steps:

1. The present invention tests the new rule and each preexisting rule for intersection. If an intersection is found, the administrator is asked to declare domination.
2. After all dominations are declared, the Priority Number Algorithm set forth above, is run.
3. If the Priority Number Algorithm ends by finding a cyclic domination pattern, then the program writes the same and the administrator is allowed to reverse one or more domination declarations or erase one or more rules. Then the rule set is resubmitted to the Priority Number Algorithm.
4. Else, all rules have priority numbers.
5. The present invention then tests the new rule and all preexisting rules for inclusion. If an inclusion is found, the priority numbers of the new rule and the preexisting rule are compared. If any pair is found in which the priority number of the included rule is higher than that of the other rule, then the present invention writes that there is an inclusion error (a rule has been entered which will never be referenced). Else, the present invention writes that the rule set with the new rule does not have an inclusion error.
6. In the preferred embodiment, all the results from the above five functions are displayed or made available for display as computer generated images accompanied by computer generated text.

In view of the foregoing, the present invention provides an improved method and apparatus that improved the filtering process.

While the invention has been described in terms of preferred embodiments, those skilled in the art will recognize that the invention can be practiced with modification within the spirit and scope of the appended claims.

Having thus described our invention, what we claim is as follows:

1. A method for managing traffic flow within a communications network comprising the steps of:
   providing, in a computer, a first database of rules;
   executing a first computer program that sorts the database and identify pairs of rules fitting at least one predetermined criterion;
   identifying the dominant rule in each pairs of rule;
   generating a second database including pairs meeting the predetermined criterion and indicating which one of the two in each pair dominates;
   executing a second algorithm that analyzes the second database and assigns priority numbers to the rules in said second database.

2. The method of claim 1 further including the step of said second algorithm analyzing the second database and indicating circular domination pattern within said rules.

3. The method of claim 1 further including the step of using the second algorithm to examine the second database, indicating rules that are included in another rule and which are also of lower priority than the other rule.

4. The method of claim 1 further including the step of conveying information to a user by computer generated graphics or text or both.

5. The method of claim 4 wherein the computer generated graphics includes a displaying an a cyclic directed graph.

6. The method of claim 5 wherein the a cyclic directed graph includes vertices representing rules fitting the predetermined criteria, edges connecting pairs of rules fitting the predetermined criteria and a pointer on each edge designating domination of one rule over another.

7. The method of claim 6 wherein the pointer is being positioned on said edges to point from the lower priority rule to the higher priority rule.

8. The method of claim 7 wherein priority numbers, for the rules recorded at the vertices, are being displayed on the graph.

9. The method of claim 1 wherein the format for each rule in the first database includes upper and lower bounds for each of a Source Address (SA), Destination Address (DA), Source Port (SP), Destination Port (DP), Protocol (P) or some other combination of acceptable values, and Action.

10. The method of claim 1 further including the steps of correlating a key in an IP packet with rules in the first data base of rules; and comparing the key with the dominating rule in each pair of rules only if the key matches at least two rules in said first data base of rules.

11. The method of claim 10 wherein the key includes the header in the IP Frame, said header having SA, DA, SP, DP and P fields or some other combination of values.

12. The method of claim 1 wherein the dominant rule is being identified by an operator in response to a prompt from the computer.

13. The method of claim 1 wherein the predetermined citron includes at least two rules intersecting in the data base of rules.

14. The method of claim 13 wherein the information is presented in the form of an a cyclic directed graph and text.

15. The method of claim 14 wherein the inconsistencies include cyclic domination or inclusion of rules.

16. The method of claim 13 further including the step of alerting the network administration if inconsistencies are being detected during analysis of said database.

17. A method comprising the machine implemented steps of:
   entering a new rule in the machine;
   using a program executed on said machine to explicitly query a network administration to enter a domination declaration for every pre-existing rule intersecting, i. E. identical, the new rule;

using a program to build a table including pairs of rules that intersect and the domination declaration;

using the program to analyze rules in the table;

generating priority numbers for said rules; and displaying information representing the rules and respective priority numbers.

18. A sorting method comprising the steps of:

(a) providing, in a computer, a database of intersecting rules and indicia indicating dominant rules;

(b) executing a program on said computer, said program parsing the database and generating priority numbers for the rules;

(c) using a filter rule mechanism identifying multiple rules fitting a pre-determined criteria; and (d) correlating the multiple rules and the priority numbers to select the rule with the highest priority.

19. The method of claim 18 wherein the predetermined criteria includes values from a Header in an IP Frame.

20. The method of claim 19 wherein the Header includes SA, DA, SP, DP and Protocol fields or some other pre-determined combination of values.

21. The method of claim 19 further including the steps of processing the IP Frame in accordance with the action associated with the highest priority rule which the key fits.

22. A machine for use in a communications network comprising:

a system bus;

a CPU operatively coupled to the system bus;

a memory operatively coupled to the system bus, said memory storing a first database of intersecting rules and indicia indicating dominant rules; and a program loaded on said CPU and when executed, parses the database and generates priority numbers for said rules.

23. The machine of claim 22 further including:

a memory in which a database of rules are stored;

a filtering system including an algorithm that correlates information in a frame with the database and identifies a plurality of rules that fit the information; and circuits that correlate priority information with the rules and select the one having the highest priority.

24. A network device including:

a memory in which a database of rules are stored;

a filtering system including an algorithm that correlates information in a frame with the database and identifies a plurality of rules that fit the information; and circuits that correlate priority information with the rules and select the one having the highest priority.

* * * * *